L. C. JORDAN.
ROOF FOR BOX CARS.
APPLICATION FILED NOV. 17, 1917.

1,298,220.

Patented Mar. 25, 1919.
2 SHEETS—SHEET 1.

Inventor
Leonard C. Jordan.
By Lancaster and Allwine
his Attorneys

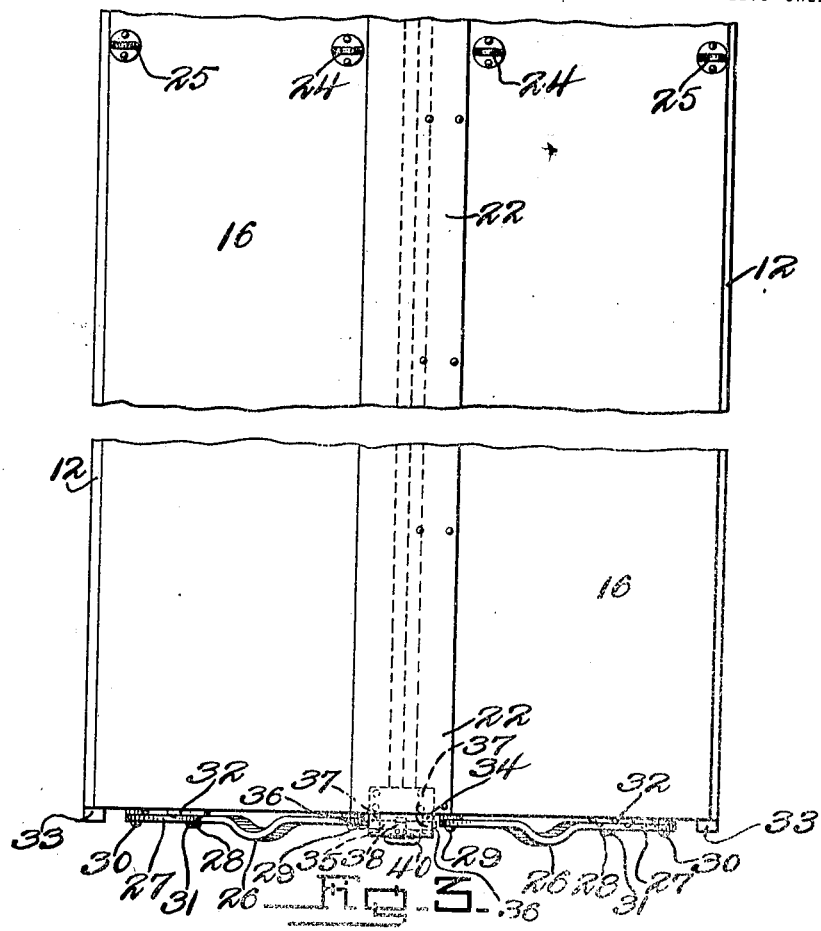

UNITED STATES PATENT OFFICE.

LEONARD C. JORDAN, OF MORSEMERE, NEW JERSEY.

ROOF FOR BOX-CARS.

1,298,220.

Specification of Letters Patent.

Patented Mar. 25, 1919.

Application filed November 17, 1917. Serial No. 202,488.

*To all whom it may concern:*

Be it known that I, LEONARD C. JORDAN, a citizen of the United States, and a resident of Morsemere, in the county of Bergen and State of New Jersey, have invented certain new and useful Improvements in Roofs for Box-Cars, of which the following is a specification.

The present invention relates to car roofs, and has more particular reference to an improved roof construction for freight cars of the type commonly known as box cars.

The present type of freight car which is commonly known as the box car is provided only with side doors, and in some instances with end doors, and in loading and unloading these cars it is necessary to use hand trucks, and to carry heavy articles from platforms and the like, specially constructed for the purpose; a time consuming and expensive method, besides limiting the size and weight of the articles to be transported.

The present invention aims to overcome these disadvantages by the provision of a freight box car with a roof which may be easily opened to admit the placing of articles of practically any size and weight within the capacity of the car, the improved structure being such that a crane or hoist may be employed for handling the pieces of freight irrespective of their size; and to admit the direct loading and unloading of freight cars from ships and the like, by use of the derrick usually carried on the ships, by bringing the improved cars along side of ships on a float or on a track or a wharf.

The invention also has for an object to provide a roof construction wherein when the roof is open, the top of the car is left entirely open and free of obstruction so that pieces of freight may be readily lowered into and raised out of the car, and the pieces of freight may be of practically any size within the combines of the length of the car.

The above, and various other objects and advantages of this invention will be in part described, and in part understood, from the following detailed description of the present preferred embodiment, the same being illustrated in the accompanying drawings, wherein Figure 1 is a fragmentary end elevation of a freight car of the box type having the improved roof of this invention applied thereto.

Fig. 3 is a fragmentary top plan view of one end of the car with the roof of this invention applied thereto and in closed position.

Fig. 4 is a fragmentary side elevation of one end of the car showing the roof partly open, and showing the roof securing means in detached position.

Figure 2:
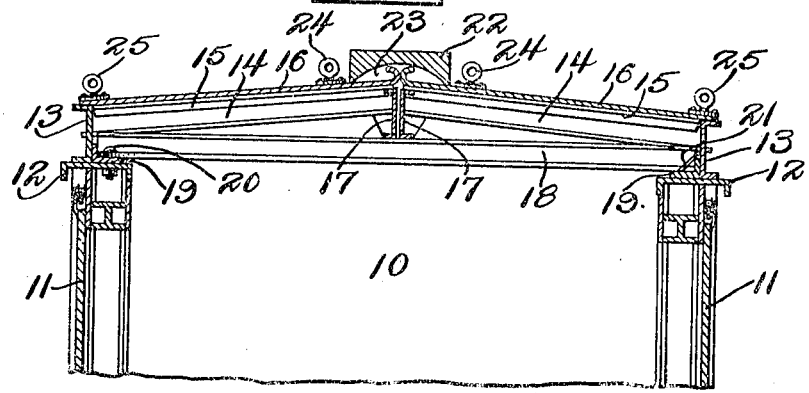
Fig. 2 is a transverse section taken through the upper portion of the freight car intermediate its ends, showing the roof construction and the support therefor.

Referring to these drawings, 10 designates the body of a freight car of the box type having the usual side doors 11 and provided with longitudinally extending channel beams 12 upon the upper edges of the side walls. The beams 12 are arranged with the flanges projecting downwardly, and channel beams 13 are secured in edgewise relation upon the upper surfaces and near the outer edges of the beams 12 to form supports for the roof hereinafter specifically referred to. The beams 13 extend longitudinally of the car and are secured to the outer edges of the roof sections at the eaves thereof and are adapted to support the sections upon the beams 12. The roof sections are each preferably in the form of a body structure extending longitudinally of the car from end to end thereof and arranged toward the opposite sides of the car. Each roof section comprises a plurality of transverse ribs 14 across the upper edges of which is secured a covering of metal 15 or the like, over which a weather-proof covering 16 is placed. The inner edges of the roof sections are adapted to meet in the medial vertical plane of the car body, and the inner edges of the roof sections are reinforced by the provision of channel beams 17 which together form the ridge member of the roof, and which are adapted to seat upon an adjustable cross beam or girder 18. The girder 18 is arranged intermediate the ends of the car body 10 and rest at its opposite extremities upon angle strips 19 which are secured to the upper faces of the side beams 12, and which are arranged near the inner longitudinal edges of the side beams. The upstanding flanges of the angle beams or strips 19 comprise stops adapted to receive the lower edge portion of the roof beams 13 thereagainst, and also serve as weather strips to prevent beating in of rain, wind and the like, beneath the roof. The cross beam 18 is pivotally connected at one end by a bolt 20 or the like to one of side beams 12, and is adapted to be swung about the bolt 20 into the plane of one of the sides of the car to leave an unobstructed passage in the top of car from end to end thereof. A latch 21 or the like may be employed upon the free end of the beam 18 to secure the same to the opposite side of the car and thus prevent the beam 18 from displacement during travel. One of the roof sections has secured thereto the running board or tread 22 which overlaps the inner edge of the other roof section and which is provided longitudinally with a groove or concavity 23 within which the upper edges of the ridge beams 17 are accommodated, and to also receive therein the rolled over inner edges of the outer roof covering 16. The edges of the roof covering 16 are rolled over, as shown in Fig. 2, for the purpose of preventing the leakage of rain or the like between the meeting edges of the roof sections should the rain beat in beneath the running board 22. Each section of the roof is provided with one or more eyes 24 arranged near the inner edge of the roof sections and adapted to engage the hook of a hoist or the like for aiding in the opening of the roof. Each section is also provided with one or more eyes 25 arranged near the eaves or outer edges of the roof sections adapted to be engaged by the hook of a hoist or the like, for the purpose of closing the roof.

Figure 1:
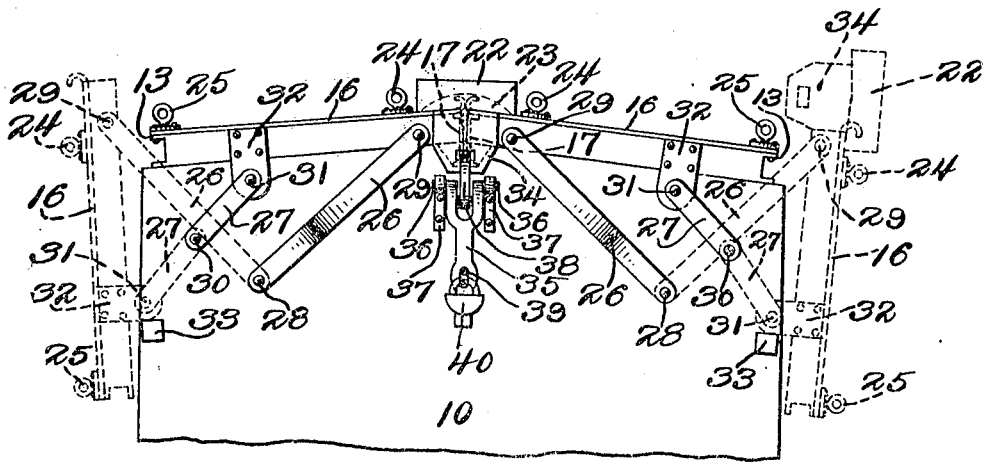

Each roof section is connected at opposite ends to the ends of the car body 10 by pairs of links 26 and 27. Fig. 1 illustrates the application of a pair of the links for the adjacent ends of the roof sections at one extremity of the car. Each link 26 is pivoted at 28 to the end of the car body 10 and is pivoted at its opposite ends by a pin 29 to the adjacent end of the roof section near the inner edge of the same. The link 28 is of sufficient length to carry the inner edge portion of the roof section upwardly and outwardly over the adjacent corner of the car body 10 into the position shown in dotted lines in Fig. 1. When in this position the link 26 is employed for the purpose of holding the roof section relatively flat against the adjacent side wall of the car. Each link 27 is relatively short and is pivoted at 30 to the end of the car body 10 at a point in a horizontal plane above that of the pivot 28. The free end of the link 27 is pivotally connected at 31 to an ear 32 depending from the adjacent end of the roof section near the eave of the latter, the short link 27 being of sufficient length to guide the outer edge portion of the roof section over the adjacent corner of the car body 10, and the pivot 30 being so located upon the end of the car body as to support the outer edge portion of the roof section closely against the adjacent side wall of the car body when the roof is opened. The end of the car body 10 is provided with a rest or stop 33 adapted to engage the ear 32 and supports the roof sections when in open position. The links 26 and 27, and the parts to and engaging the same are similarly constructed and arranged at each end of each of the roof sections. It will be noted that the intermediate portion of the link 26 is bowed outwardly, this construction being had for the purpose of accommodating the pivot 30 and the adjacent end of the link 27 beneath the lever 26 when the roof is opened.

The opposite ends of the running board 22 are provided with depending apertured ears 34 which slightly overlap the end portions of the body 10. A hasp 35 is pivotally mounted at the end of the body 10, the pivoted end of the hasp 35 being forked and connected by pins 36 to eyes 37 which are secured to the body 10. A hook 38 is pivotally mounted in the fork of the hasp 35 eccentric to pins 36 and is adapted to enter the aperture of the adjacent ear 34, and to draw the ear 34 downwardly to bind the roof closed when the hasp 35 is swung down against the adjacent end of the car body 10. The hasp 35 is slotted at its lower end and adapted to receive therein a staple or apertured lug 39, the latter being adapted to receive a lock 40, a seal or suitable device if desired.

Figure 5:
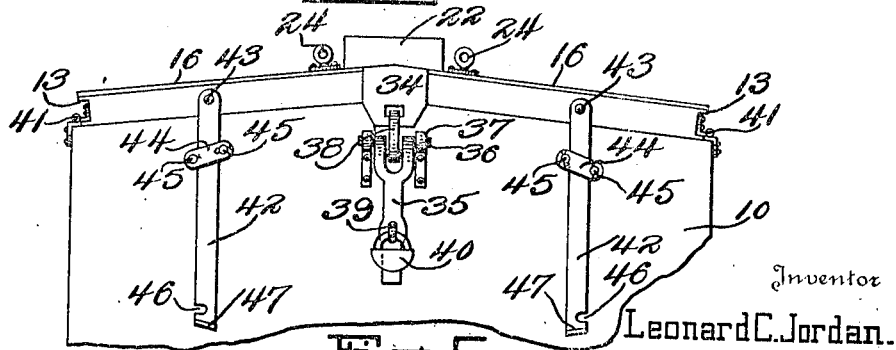
Fig. 5 is a fragmentary end elevation of a box car having a modified form of roof construction applied thereto.

In Fig. 5 of the drawings there is shown a modified form of connection between the roof sections and the ends of the car body. In this modified construction the roof sections are secured at their eaves by hinges 41 to the side walls of the car body 10, and each roof section is provided on opposite ends with a relatively long link 42 mounted upon a pivot 43 which projects from the adjacent end of the roof sections intermediate the inner and outer edges thereof. Straps 44 are secured to the opposite ends of the body 10 and are adapted to receive therethrough the intermediate portions of the links 42, the straps being spaced outwardly from the end of the body and supported upon bolts 45. The free end portion of the link 42 is provided with a notch 46 in one edge adapted to engage in an adjacent bolt 45 and retain the link 42 from longitudinal movement when the roof section is raised into an open position. This construction prevails with respect to each link 42 for supporting the opposite ends of the roof section when in raised position. The free ends of the links 42 are provided with stop flanges or heads 47 adapted to engage the straps and hold the links 42 from being withdrawn from within the straps. These straps 47 also retain the roof section from swinging outwardly from the sides of the car body beyond a predetermined extent.

With this latter construction, it is only necessary to provide the eyes 24 adjacent the inner abutting edges of the roof sections as the eyes 24 are adapted to receive the hoisting hook or cable therethrough for raising and lowering the inner edge portions of the roof sections.

In use, when it is desired to open the roof of the car, it is only necessary to release the hooks 38 from the ears 34 and to then attach the hook or hoisting cable to the ear 24 of the roof section which carries as a part thereof, the running board 22. When the roof section of the first described form is thus raised, the links 26 and 27 are swung about their pivots 28 and 30 with the result that the roof section is carried over the adjacent corner of the car body and is suspended along one side of the car and supported upon the rests 33. The other roof section may now be swung into open position in a similar manner. In the case of the modified construction shown in Fig. 5, when an eye 24 of the running board carrying roof section is drawn upwardly, the roof section swings about the hinge 41 and the link 42 is drawn through the adjacent strap 44. As soon as the roof section is raised into substantially a vertical position, the stop 47 engages the strap 44 and the notch 46 receives the bolt 45 therein to lock the stop 42 from sliding through the strap. The other roof section of the modified form is raised in a similar manner, and the links 42 are relied upon for retaining the roof section in open position during the removal from or the positioning in of the pieces of freight.

In each instance, the beam 18 is employed and as soon as the roof sections are swung into open position, the latch 21 is released and the beam 18 is swung toward one side of the car about its pivot 20 and rests upon the adjacent side wall beam 12 out of the way.

In closing the roof, the crane or hoist is connected, in the first described form to the outer eye 25 for raising the roof sections one at a time into closed position, the links 26 and 27 guiding the roof sections into their proper relative position with the ridge beams 17 abutting. In the modified construction, the hoist or crane is connected to the eyes 24 and is merely employed for gradually lowering the roof sections into closed position. Care must be exercised in each instance to first close the roof section which underlap the running board 22 so that the latter may be properly positioned over the joist between the roof sections and admit of the latter closing to their full extent. The ridge beams 17 extend across the transverse beam 18 when the roof is closed and the beam 18 supports the intermediate portion of the roof.

It is of course understood that various changes and modifications may be made in the details of construction and design of the above specifically described parts of this invention without departing from the spirit thereof, such changes and modifications being restricted only by the scope of the following claims.

What is claimed is:

1. In a car roof, the combination with a box car body, of a pair of opposed roof sections, adapted to be opened and closed, means for connecting the sections to the car body and guiding the sections in their opening and closing movements, and an intermediate brace for said roof sections adjustably mounted across the top of the car body and adapted to be swung toward one side of the body when the roof is open.

2. In a car roof, the combination with a box car body, of a pair of opposed roof sections, adapted to be opened and closed, said sections including outer coverings having their meeting edges rolled over to form convex engaging surfaces, a running board secured to one of said sections, and overlapping the edge of the other section, said running board provided with a concavity in its under surface for receiving therein the rolled over edges of the outer covering.

3. In a car roof, the combination with a box car body, of a pair of longitudinal roof sections, long links hinged at one end to the ends of the car body and at their opposite ends to the inner adjacent edges of the roof sections when closed, short links pivoted to the opposite ends of the car body outwardly and above the car body pivot of the long links and pivoted at their ends to said roof sections near the eaves of the same, said roof sections including outer coverings having their meeting edges rolled over to form convex engaging surfaces, a running board secured to one of said sections, and overlapping the edge of the other sections, said running board provided with a concavity in its under surface for receiving therein the rolled over edges of the outer covering.

4. In a car roof, the combination with a box car body, of a pair of opposed longitudinal roof sections, means for connecting the roof sections to the car body and admitting of the swinging of the sections toward and from each other into closed and open positions, said roof sections each including a longitudinally extending ridge beam, and an adjustably mounted cross beam carried upon the car body adapted to engage said ridge beams and support the inner meeting edges of the roof sections when closed.

5. In a car roof construction, the combination with a box car body of a pair of longitudinal roof sections, means for connecting said sections to the car body and admitting of the movement of the sections toward and from each other into closed and open positions, and a transverse beam pivoted at one end to one side of the car body and adapted to be swung across the top of the body to form a brace, the said roof sections having downwardly extending ridge beams adapted to engage across said brace to support the meeting edges of said roof sections in slightly elevated position.

6. In a car roof construction, the combination with a box car body, of a pair of opposed longitudinal roof sections, pairs of links connecting the opposite ends of said sections to the car body and adapted to be swung upon the movement of the sections into open and closed position, said links being arranged to support the sections at the outer sides of the car body when the roof is open, and an intermediate brace adjustably mounted across the top of the car body and adapted to be swung toward one side of the body when the roof is open.

7. In a car roof, the combination with a box car body, of a pair of longitudinal roof sections, long links hinged at one end to the ends of the car body and at their opposite ends to the inner adjacent edges of the roof sections when closed, and short links pivoted to the opposite ends of the car body outwardly and above the car body pivots of the long links and pivoted at their ends to said roof sections near the eaves of the same.

8. In a car roof, the combination with a box car body, of a pair of longitudinal roof sections, pairs of links connecting the opposite ends of the roof sections to the car body, said pairs of links comprising inner long links and outer short links, the pivots of the short links being arranged upon the car body above and outwardly of the pivots of the long links, and rests carried upon the opposite end of the car body adapted to receive the long links thereagainst for supporting the roof sections against the sides of the car when the roof is open.

9. In a car roof, the combination with a box car body, of a pair of longitudinal roof sections, long links hinged at one end to the ends of the car body and at their opposite ends to the inner adjacent edges of the roof sections when closed, short links pivoted to the opposite ends of the car body outwardly and above the car body pivot of the long links and pivoted to the ends of said roof sections near the eaves of the same, said roof sections each including a longitudinal ridge beam, and an adjustably mounted cross beam carried upon the car body adapted to engage said ridge beams and support the inner meeting edges of the roof sections when closed.

10. In a car roof construction, the combination with a box car body, of a pair of opposed longitudinal roof sections, pairs of links connecting the opposite ends of said sections to the car body and adapted to be swung upon movement of the sections into open and closed positions, said links arranged to support the sections at the outer sides of the car body when the roof is opened, said roof sections including outer coverings having their meeting edges rolled over to form convex engaging surfaces, a running board secured to one of said sections, and overlapping the edge of the other sections, said running board provided with a concavity in its under surface for receiving therein the rolled over edges of the outer covering.

11. In a car roof, the combination with a box car body, of a pair of opposed longitudinal roof sections, means for connecting the roof sections to the car body, and admitting of the swinging of the sections toward and from each other into closed and open positions, said roof sections including outer coverings having their meeting edges rolled over to form convex engaging surfaces, a running board secured to one of said sections, and overlapping the edge of the other section, said running board provided with a concavity in its under surface for receiving therein the rolled over edges of the outer covering, a longitudinally extending ridge beam carried by each of said roof sections, and an adjustably mounted cross piece carried upon the car body adapted to engage said ridge beam and support the inner meeting edges of the roof sections when closed.

LEONARD C. JORDAN.